United States Patent [19]

Rasmussen et al.

[11] Patent Number: 5,051,191

[45] Date of Patent: Sep. 24, 1991

[54] METHOD TO DETOXIFY SEWAGE SLUDGE

[75] Inventors: Hans W. Rasmussen, St. George, Utah; Michael A. Rockandel, Richmond, Canada

[73] Assignee: Green Environmental Systems Ltd., Hong Kong, Hong Kong

[21] Appl. No.: 607,026

[22] Filed: Oct. 31, 1990

[51] Int. Cl.$^5$ ............................................. C02F 11/14
[52] U.S. Cl. .................................... 210/721; 210/724; 210/758; 210/759; 210/901; 210/912; 210/913
[58] Field of Search ............... 210/710, 711, 721, 724, 210/609, 754, 756, 758, 759, 760, 912, 901, 913

[56] References Cited

U.S. PATENT DOCUMENTS

| | | | |
|---|---|---|---|
| 1,511,418 | 10/1925 | Maclachlan | 210/710 |
| 4,108,771 | 8/1978 | Weiss | 210/916 |
| 4,221,661 | 9/1980 | Shimizu et al. | 210/759 |
| 4,256,630 | 3/1981 | Fremont | 210/710 |
| 4,277,342 | 7/1981 | Hayes et al. | 210/609 |
| 4,370,233 | 1/1983 | Hayes et al. | 210/609 |
| 4,377,486 | 3/1983 | Barrick et al. | 210/609 |
| 4,717,484 | 1/1988 | Kauffer | 210/711 |
| 4,765,908 | 8/1988 | Monick et al. | 210/666 |
| 4,765,911 | 8/1988 | Rasmussen | 210/710 |
| 4,814,091 | 3/1989 | Napier et al. | 210/665 |
| 5,009,793 | 4/1991 | Muller | 210/721 |

FOREIGN PATENT DOCUMENTS 53-110964  9/1978  Japan ................................. 210/759

Primary Examiner—Peter Hruskoci
Attorney, Agent, or Firm—Carl Schaukowitch

[57] ABSTRACT

A method to detoxify municipal sewage sludge containing heavy metals comprises the steps of mixing sewage sludge, at least one catalytic oxidant such as a ferric salt, at least one regenerative oxidant and an acid to form a reacting slurry having a solids fraction and a liquid fraction and, after a suitable retention time, separating the solids fraction from the liquid fraction. The reacting slurry is maintained during its retention time at a pH range between approximately 1.0 to 2.0 and at an oxidation reduction potential of, at least, +400 milivolts. The heavy metals originally absorbed into the solids fraction of the sewage sludge solubilize into the liquid fraction of the reacting slurry. Thereafter, the reacting slurry is discharged into a conventional solids/liquid separating device so that the metal-laden liquid fraction becomes separated from the solids fraction which is now substantially bar ren of heavy metals. The solids fraction is neutralized to a pH prescribed by EPA regulations so that it can be safely applied to agricultural land as a detoxified fertilizer and soil conditioner.

11 Claims, 3 Drawing Sheets

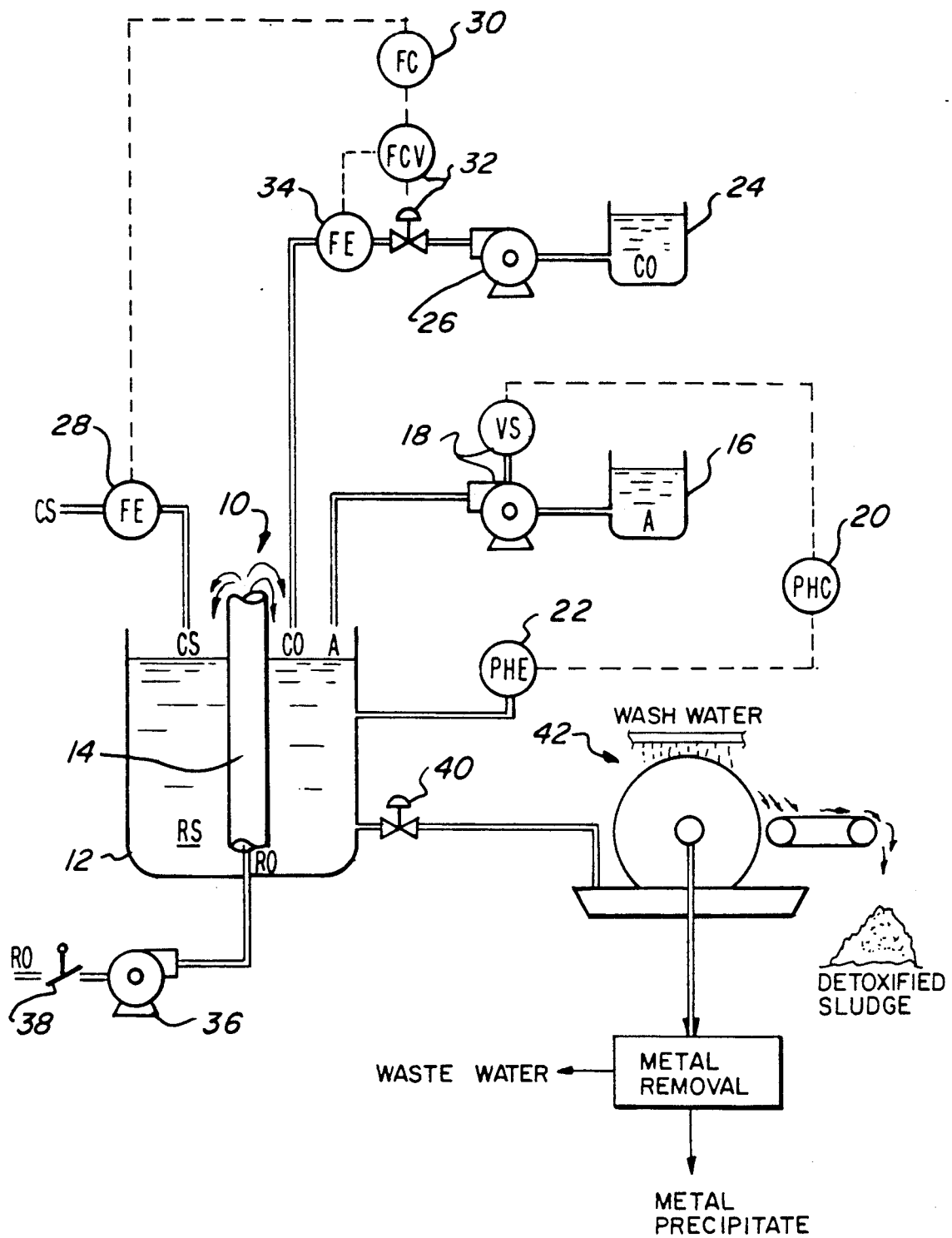
Fig_1

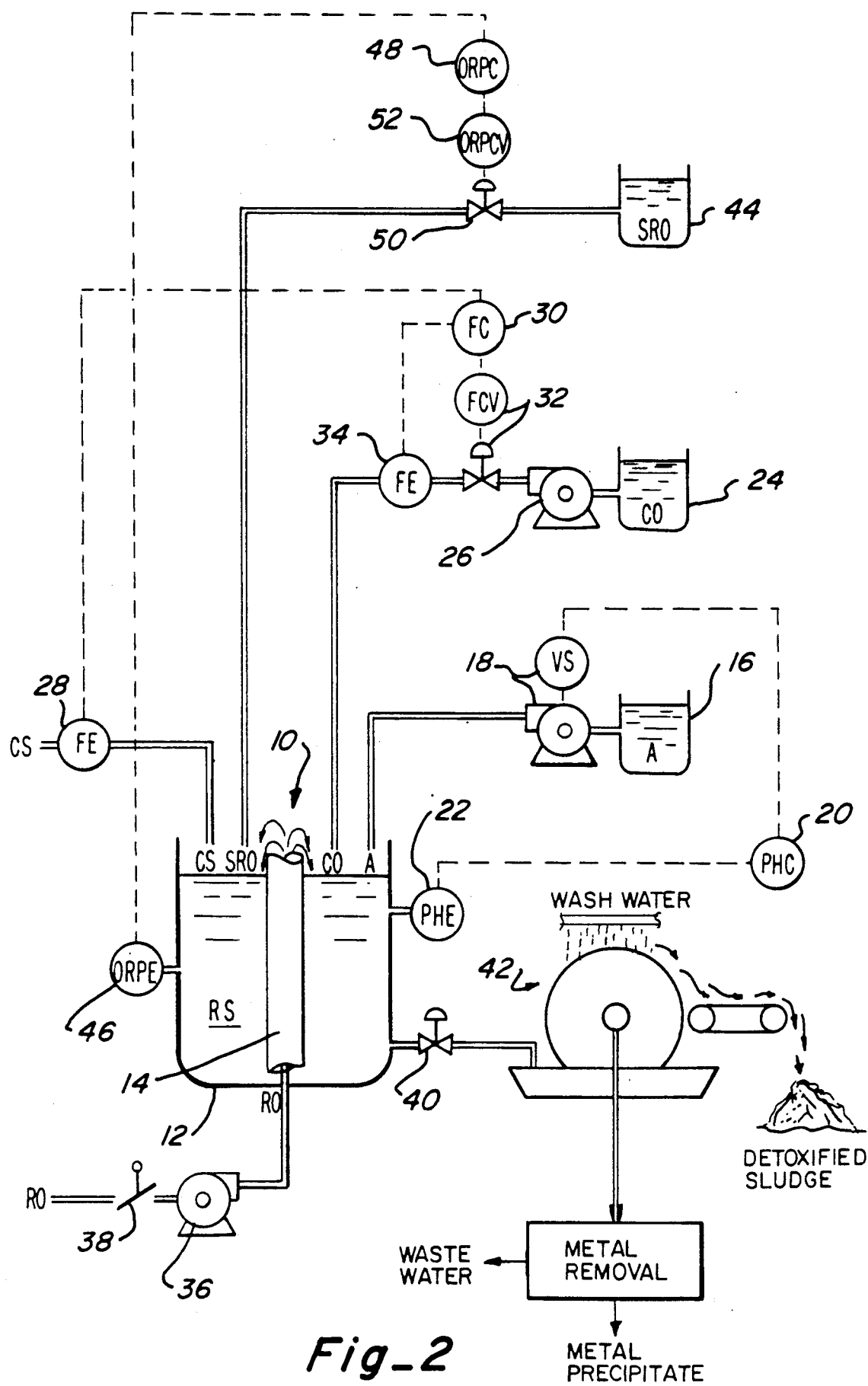
Fig_2

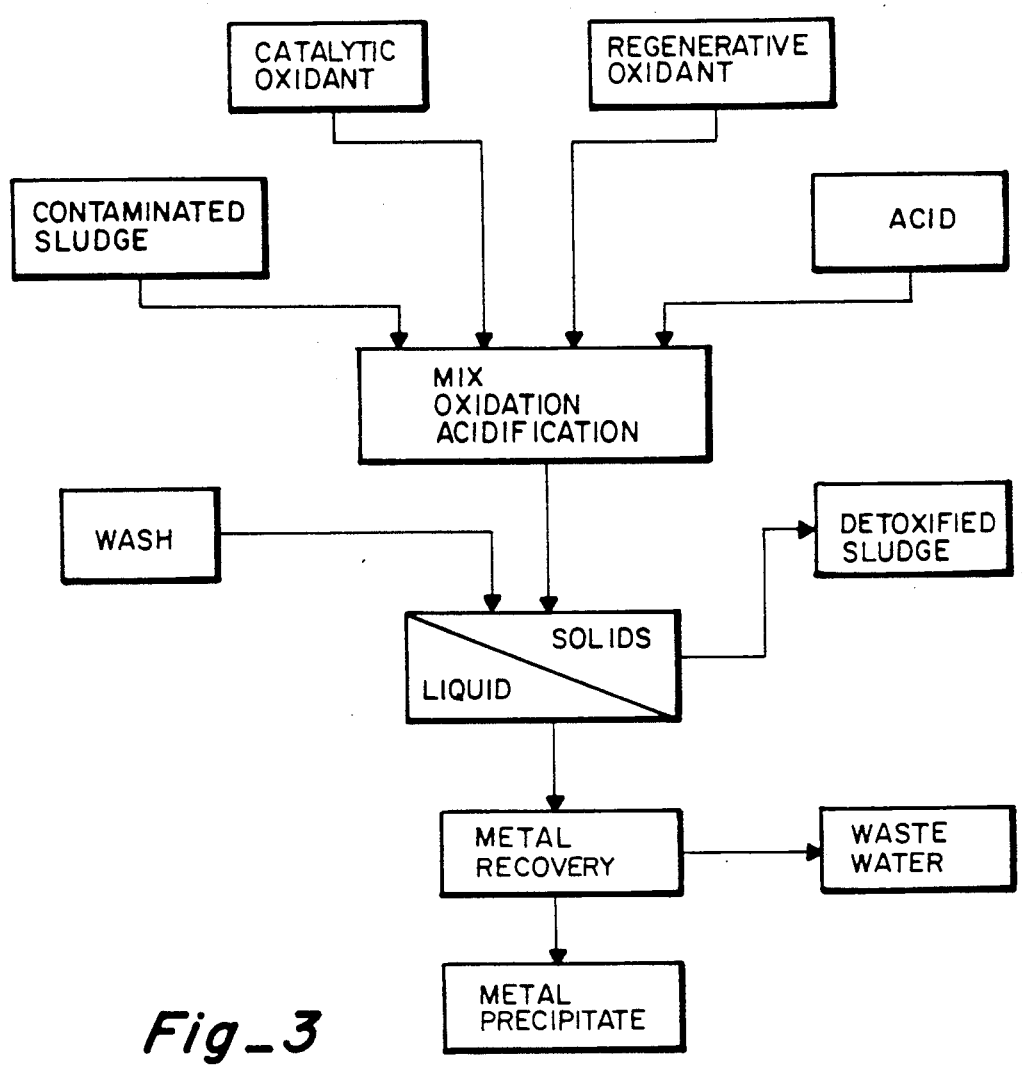
Fig_3
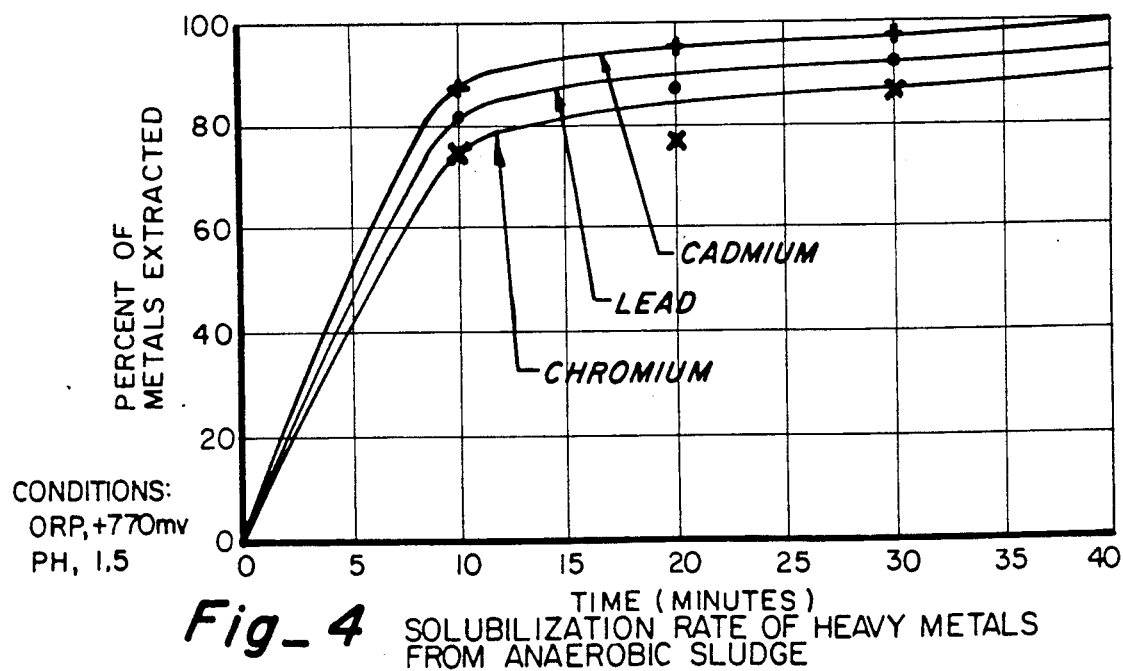
Fig_4 SOLUBILIZATION RATE OF HEAVY METALS FROM ANAEROBIC SLUDGE

METHOD TO DETOXIFY SEWAGE SLUDGE

BACKGROUND OF THE INVENTION

This invention relates to a new method to detoxify municipal sewage sludge contaminated with heavy metals. More particularly, this invention relates to a new method to detoxify municipal sewage sludge so that the heavy metals contained therein could meet or exceed the sludge quality standards established by the United States Environmental Protection Agency for safe land application.

With reference to the Federal Register dated Feb. 6, 1989, and cited as Volume 54, Number 23 commencing on Page 5754, the U.S. Environmental Protection Agency will implement stringent regulations to protect public health and the environment from any anticipated adverse effects of pollutants contained in sewage sludge. In brief, these unprecedented regulations which are targeted for implementation in October, 1991, establish requirements for the final use and disposal of sewage sludge. The Association of Metropolitan Sewage Agencies (AMSA) considers these regulations a radical departure from current sludge use and sludge disposal practices at existing publicly owned treatment works (POTW's). AMSA believes that, in many instances, existing sludge management practices at POTW's would not be in compliance with these proposed regulations.

Sewage sludge is the residue from processed municipal sewage and it typically contains more than 90% water, colloidally dispersed solid particles (some of which are fragile) and dissolved substances. Although the chemical and biological constituents of sludge depend upon the composition of the wastewater entering the POTW and the subsequent treatment processes, typically, these constituents are heavy metals, disease-causing pathogenic organisms such as bacteria, viruses and parasites, volatile organic solids, nutrients, humates and/or industrial waste.

Metals contained in sewage sludge pose a severe threat to human health and the environment. Approximately 7.5 million dry tons of sludge are produced in the United States annually. Approximately 20% of this sludge is applied to land for its organic and nutrient value; approximately 40% is disposed in municipal landfills; approximately 5% is disposed by ocean dumping; and approximately 20% is incinerated. All of these methods of use and disposal adversely affect the environment because the cumulative concentration of these metals as they recycle into the environment through these methods can have a toxic effect in the food chain and, subsequently, on human health. Toxic levels of heavy metals can accumulate in human kidneys, liver and other organs of the body causing functional disorders which can be lethal.

In the past, processes have been developed to remove heavy metals from sewage sludge. A typical method of heavy metals removal from sewage sludge utilizes standard acidification techniques. Although acidification is effective in leaching (also commonly referred to as "solubilizing") the more soluble heavy metals from sludge, some of the predominant heavy metals in sewage sludge are not amenable to acid dissolution.

Hayes et al. in their U.S. Pat. No. 4,370,233 disclose a method for chemical detoxification of anaerobically-digested organic sludge containing toxic heavy metals in insoluble form. This method includes raising the oxidation reduction potential (hereinafter sometimes referred to as "ORP") of the sludge to above +300 millivolts (hereinafter referred to as "mv") and maintaining this condition for a period of 6 to 12 hours. During this time period, the sludge is oxidized making the heavy metals more conducive to chemical leaching. Immediately thereafter, the sludge is acidified to a pH range between 1.0 to 3.0 for an additional period of 6 to 12 hours by the addition of a concentrated acid such as sulfuric acid or hydrochloric acid while continuing to agitate the sludge and while maintaining a prescribed temperature range and ORP above +300 mv by aeration. Hayes et al. rely upon the principle that if sludges can be maintained at an elevated temperature and ORP for a prolonged period of time prior to acid treatment, a shift in heavy metal speciation will occur toward metal precipitate forms that are more rapidly solubilized upon acidification.

Several drawbacks seem apparent with the Hayes et al. method of heavy metals detoxification of sewage sludge. First, residence time is long; the minimal combined time period for oxidation and acidification is 12 hours. Such a long residence time suggests a need for extremely large tankage to facilitate chemical processing. Second, oxidation and acidification occur sequentially which also contributes to the lengthy time period for this method to be effective. Third, nothing disclosed in the patent suggests that an oxidation reduction potential much above +300 millivolts can be achieved. Fourth, temperature maintenance is an important feature which adds to the cost of operations. Fifth, it is preferable to elevate the temperature and ORP of the sludge for prolonged periods of time prior to acidification. Again, this two-staged process requires a relatively long time period to be effective and there are added costs associated with elevated temperatures as well as maintenance thereof.

It is from these considerations and others that the present invention has evolved.

SUMMARY OF THE INVENTION

A method for the detoxification of municipal sewage sludge containing heavy metals is disclosed A quantity of sludge containing heavy metals is introduced into a vessel and mixed with a catalytic oxidant such as a ferric salt, a regenerative oxidant and an acid to form a solids/liquid reacting slurry having an approximate pH range between 1.0 and 2.0 and an ORP of, at least, +400 millivolts. After a suitable retention time, the heavy metals present in the solids fraction solubilize into the liquid fraction of the reacting slurry. Thereafter, the reacting slurry is discharged into a conventional solids/liquid separating device preferably with washing capability to separate the metal-laden liquid fraction from the solids fraction which is now substantially barren of heavy metals. The solids fraction is neutralized to a pH prescribed by EPA regulations so that it can be safely applied to land as a detoxified fertilizer and/or soil conditioner.

The present invention is described and shown in greater specificity and detail in the following description of the preferred embodiment and drawings. Comprehension of the various aspects of the invention should lead to an increased appreciation for the significance of the invention and its advancement of the prior art.

OBJECTS OF THE INVENTION

The primary object of the present invention is to detoxify sewage sludge so that the heavy metals contained therein could meet or exceed the sludge quality standards established by the U.S. Environmental Protection Agency for safe land application.

Another object of the present invention is to provide a method that would generate a rapid rate of oxidation and cause a high oxidation reduction potential thereby substantially reducing the residence time for both oxidation and acidification, two essential steps for chemical detoxification of sewage sludge.

Yet another object of the present invention is to provide a simple, retrofittable, "add-on" system to existing wastewater treatment systems without interruption to current wastewater treatment practices or modification to current sludge disposal or use methods.

A further object of the present invention is to substantially reduce the biological oxygen demand and chemical oxygen demand while effecting a substantial reduction of the coliform content of the sludge.

Still further, another object of the present invention is to provide a detoxification method easily adaptable to a heating means so that, if desired, elevated temperatures could be achieved and maintained to destroy additional pathogenic organisms including ova of the Ascaris roundworm which is considered one of the most environmentally resistant forms of pathogens.

BRIEF DESCRIPTION OF THE DRAWINGS

Other objects, advantages and capabilities of the present invention will become more apparent as the description proceeds, taken in conjunction with the accompanying drawings, in which:

FIG. 1 is a simplified mechanical flow chart illustrating a combination of conventional devices for practicing the present invention;

FIG. 2 is a simplified mechanical flow chart illustrating an alternative combination of conventional devices for practicing the present invention;

FIG. 3 is a conceptual flow chart of the present invention; and

FIG. 4 is a graph depicting the solubilization rate of lead, cadmium and chromium in anaerobic sludge oxidized to a final ORP of +770 mv and acidified to a pH of 1.5 with hydrochloric acid.

DESCRIPTION OF THE PREFERRED EMBODIMENT

A new method detoxifies municipal sewage sludge contaminated with heavy metals to meet or exceed sludge quality standards established by the United States Environmental Protection Agency for safe land application. In general, this method comprises the steps of mixing sewage sludge contaminated with heavy metals with a catalytic oxidant such as a ferric salt, a regenerative oxidant and an acid, thereby forming a reacting slurry having a solids fraction and a liquid fraction, and thereafter separating this reacting slurry into its solids and liquid fractions by use of a conventional solids/liquid separating device preferably with washing capabilities. The quantities of the catalytic oxidant and the regenerative oxidant must be sufficient to raise the ORP of the reacting slurry to, at least, +400 millivolts. The quantity of acid must be sufficient to lower the pH of the reacting slurry to a range of approximately 1.0 to 2.0. When the ORP and pH have reached the prescribed levels, the present invention operates on a continuous basis and appropriate controls constantly monitor and maintain the prescribed levels of pH and, possibly, ORP. The reacting slurry continues to mix and circulate throughout a pachuca-type tank system for a recommended residence time of approximately 30 minutes. Thereafter, the reacting slurry is processed through a conventional solids/liquid separating device. The separated liquid fraction which is now laden with metals can be processed through an conventional metals-removal means to remove the metals contained therein. The detoxified sewage sludge, i.e. the solids fraction of the reacting slurry, is now substantially free of heavy metals. The detoxified sludge could be neutralized to a pH range prescribed by EPA regulations with a base reagent such as lime before applying it to land as a fertilizer and/or as a soil conditioner or disposing it into a landfill.

Although not by way of limitation, a suitable combination of devices is depicted in FIG. 1 to practice the present invention. For reasons discussed hereinbelow, a first device of this combination of devices is a pachuca-type tank system 10 having an acid-resistant vessel 12 with a draft tube 14 concentrically positioned therein. The acid-resistant vessel 12 receives a quantity of contaminated sludge CS, a quantity of an acid A (whether a single acid or a combination of two or more acids) and a quantity of a catalytic oxidant CO such as ferric salt. The contaminated sludge CS, acid A and the catalytic oxidant CO are mixed within vessel 12 by bubbling a gaseous, regenerative oxidant RO at the bottom portion of vessel 12 and through the draft tube 14 to form a reacting slurry RS.

The contaminated sludge CS is introduced into vessel 12 at any percentage of dry weight of solids. However, it is preferable that the contaminated sludge CS is introduced at a dry-weight percentage of solids above 2%. The higher the percentage of solids of the contaminated sludge CS the lesser the quantities of oxidants and acid are required to generate the appropriate operating conditions and, therefore, operating costs are lessened. Additionally, the contaminated sludge CS introduced into vessel 12 can be anaerobically-digested sludge, aerobically-digested sludge, primary sludge, waste-activated sludge or any combination thereof and can be processed at ambient temperature or above For anaerobically-digested and aerobically-digested sludge, temperature of the contaminated sludge CS is typically in the range of 75° F. to 95° F. and the solids content typically ranges between 0.5% and 2.0%.

It is preferable to dewater the contaminated sludge CS first by adding a cationic or anionic flocculant before introducing the contaminated sludge CS into vessel 12. Cationic flocculation requires as much as 5 pounds of cationic floc per ton of sludge whereas anionic flocculation requires as much as 1.5 pounds of anionic floc. Cationic flocculation seems to produce larger flocs which tend to settle more rapidly as compared to anionic flocculation. It has been observed during experimentation that the flocs tend to remain intact during leaching with gentle agitation and with short retention times and that flocs tend to form better when the contaminated sludge CS has a pH range from neutral to basic. It appeared that if the contaminated sludge CS was not flocculated prior to leaching, it was very difficult to flocculate thereafter. Having the flocs remain intact facilitates easier solids/liquid separation after leaching with little or no further flocculant required thereafter.

A sufficient amount of acid A is dispensed into vessel 12 automatically from an acid source 16 by means of a conventional variable speed acid feed pump 18 interconnected to a conventional pH controller 20 to render and maintain the pH of the reacting slurry RS in a range of approximately 1.0 to 2.0. A conventional pH sensing element 22 is attached by electrical wire (indicated by the dashed lines in FIG. 1) to the pH controller 20 to transmit the appropriate pH information of the reacting slurry RS to the pH controller 20. In response to the controller 20, the variable speed acid feed pump 18 feeds the appropriate amount of acid A into vessel 12 to maintain the proper pH of the reacting slurry RS. Acid A could be any one or a combination of two or more acids so long as the pH level of the reacting slurry could be reduced to and maintained an approximate pH range between 1.0 to 2.0.

Laboratory experiments were conducted with three different acids. It is understood that the term, "acid," can mean a single acid or a combination of two or more acids. However, all experimentation was conducted using single acids. Hydrochloric acid appears to have advantages over sulphuric acid and nitric acid. Hydrochloric acid leaches all metals whereas sulphuric acid did not adequately leach lead from lead-laden sewage sludge. Furthermore, precipitation of gypsum (calcium sulfate) is minimized during acid neutralization in a chloride environment. Nitric acid was also considered but discarded as an option particularly because of its high cost and its tendency to form an environmentally-unacceptable nitrate discharge in the wastewater.

In addition to acid A, the catalytic oxidant CO is dispensed into vessel 12 from a catalytic oxidant source 24 by means of a catalytic oxidant feed pump 26 to cause, among others effects explained hereinbelow, the ORP of the reacting slurry RS to rise. Any ferric salt such as ferric chloride spent pickle liquor or ferric sulfate could be used as the catalytic oxidant CO although any other liquid, dissolvable solid or gaseous catalytic oxidants could be substituted in lieu thereof. For purposes of the preferred embodiment of the present invention, ferric chloride was selected as the preferred catalytic oxidant CO.

Ferric chloride, the catalytic oxidant CO, is pumped into vessel 12 on a feed forward basis. The feed rate of the ferric chloride must be sufficient to maintain a preferable level of iron in the reacting slurry RS of 0.5 to 3.0 grams per liter. A first flow element 28 monitors the amount of contaminated sludge CS flowing into vessel 12. This first flow element 28 provides appropriate information to flow controller 30 to control the flow control valve 32 which, in turn, controls the appropriate amount of ferric chloride being directed to vessel 12. A second flow element 34 provides appropriate information to flow controller 30 assuring that the prescribed amount of ferric chloride is flowing to vessel 12. Note that the amount of ferric chloride being directed to vessel 12 is insensitive to ORP but is dependent upon the amount of contaminated sludge CS entering vessel 12.

Although a liquid regenerative oxidant RO such as hydrogen peroxide, sodium hypochlorite or calcium hypochlorite could be used for the present invention, a gaseous, regenerative oxidant RO for reasons set forth hereinbelow has been employed for the preferred embodiment. Although any gaseous, regenerative oxidant RO such as air, oxygen, ozone, sulphur dioxide, chlorine, chlorine-containing compounds or the like can be bubbled into the reacting slurry RS, compressed air was selected as the gaseous, regenerative oxidant RO for the preferred embodiment of the present invention because air is abundant and immediately available at relatively low cost.

The gaseous regenerative oxidant RO, compressed air, is directed into the reacting slurry RS from an air compressor 36. A throttle valve 38 attached to an air intake (not shown) of the air compressor 36 can be used to meter the amount of air entering vessel 12. The gaseous regenerative oxidant RO enters into the bottom portion of vessel 12 and underneath draft tube 14. Although not shown, it would be desirable to adapt a sparging apparatus where the air enters underneath draft tube 14 so that an extraordinary amount of tiny bubbles of the regenerative oxidant RO, compressed air, can be produced which, in turn, would enhance oxidation.

While preferred but not by way of limitation, the entry point of the regenerative oxidant RO into the bottom of vessel 12 is advantageous for physical handling purposes for both mixing of and generating flow for the reacting slurry RS as well as for chemical purposes, the later of which is discussed hereinbelow. As with any conventional pachuca-type tank system, the regenerative oxidant RO, compressed air, enters at the bottom portion of vessel 12 and causes desirable features of mixing and circulating the reacting slurry RS. Mixing occurs when the air bubbles, rising upwardly through the reacting slurry RS contained within draft tube 14, disturb or otherwise agitate the reacting slurry RS.

Although motor-impeller mixing was initially utilized and remains an acceptable method of mixing the reacting slurry RS, testwork indicated that motor-impeller mixing caused fragmentation of the fragile solid particles of the reacting slurry RS. Fragmentation resulted in solids/liquid problems with solids/liquid separating such as poor solids settling, media blinding and formation of a non-porous cake material. Bubbling a gaseous, regenerative oxidant RO through the reacting slurry RS was proven empirically to be an effective method of mixing and was sufficiently gentle to avoid any appreciable amount of fragmentation of the sewage sludge particles. Thus, bubbling regenerative oxidant RO into the reacting slurry RS provides advantages of mixing the reacting slurry RS without mechanical contact, a feature which is extremely beneficial in a low pH environment, oxidizing the reacting slurry RS and regenerating the catalytic oxidant CO, an advantage which is discussed in further detail hereinbelow.

Secondly, the bubbles formed by the regenerating oxidant RO cause the reacting slurry RS within draft tube 14 to displace upwardly. This allows the upwardly-displaced reacting slurry RS to flow outwardly from the top of draft tube 14 and return into the annular portion of vessel 12 outside of said draft tube 14, thus, causing the reacting slurry RS to circulate about the pachuca-type tank system 10. This circulation is due to the density differential between the bubbling reacting slurry RS within draft tube 14 and the reacting slurry RS outside of draft tube 14 and in the annular portion of vessel 12.

Flow of the incoming contaminated sludge CS and the flow of the outgoing reacting slurry RS are adjusted to provide a recommended residence time of approximately 30 minutes for this continuous flow arrangement. Once the prescribed pH and ORP conditions exist for the recommended residence time, the reacting slurry RS is dispensed from vessel 12 by appropriately adjusting an outlet valve 40. Any conventional level control technique can be employed to achieve and maintain a constant level within vessel 12 which, in turn, maintains the prescribed residence time. Under proper pH and ORP conditions i.e. an approximate pH between 1.0 and 2.0 and an ORP of +400 millivolts or greater, substantially all of the heavy metals contained in the original contaminated sludge CS reach desirable oxidation states resulting in the metals becoming susceptible to solubilization. In such states, the metals are easily leached, i.e. solubilized, from the solids fraction of the sludge and are dissolved into the liquid fraction of the reacting slurry RS.

A second device of the combination of devices shown in FIG. 1 to practice the present invention is a conventional solids and liquid separating system 42. Although most any conventional solids and liquid separating system would suffice, a vacuum-drum filter type was selected for the preferred embodiment. It would enhance the recovery of the heavy metals if washing capabilities were added onto the solids/liquid separating system. In the alternative a counter-current decantation system followed by a belt press could be used in lieu of the vacuum-filter system. No further description of the operation of these solids and liquid separating systems is provided because these devices are commonly employed in industry.

After the solids/liquid separation phase, the solids fraction which could contain from 60% to 85% liquids is now considered detoxified sludge. By washing the solids fraction which contains 60% to 85% metals-laden liquid, more heavy metals would be removed from the solids fraction by attempting to displace the metals-laden liquid with a metals-free liquid. During washing the metals-laden liquid becomes diluted thereby rendering the remaining liquid in the solids fraction substantially barren of metals. The detoxified sludge could be neutralized with a base reagent such as lime to pH standards promulgated by the EPA so that it could be applied to agricultural land as a fertilizer and/or a soil conditioner.

The metals-laden liquid which is collected from the solids/liquid separation stage is directed to a conventional metals removal means (as indicated in the block diagram in FIG. 1). The metals could be precipitated as solids by neutralizing the metals-laden liquid with a base reagent such as lime and after filtering the precipitated metals from the liquid, the remaining liquid could be discarded as wastewater or a portion of the remaining liquid could be recycled to satisfy the water needs of the wastewater treatment plant. No further description of metals removal is discussed because the technique of metals removal would be one commonly used in industry.

It is noted that FIG. 1 does not depict any ORP control or monitoring. When using solely compressed air as the regenerative oxidant in a reacting slurry RS having well-digested contaminated sludge CS, the air requirements to satisfy mixing and circulating of the reacting slurry RS is sufficient for oxidation. However, as more oxidation occurs, the more readily the heavy metals present in the solids fraction solubilize. Experimentation indicates that implementing the present invention for processing of well-digested sludge, no ORP monitoring or ORP control is required and compressed air itself is an adequate regenerative oxidant RO. To the contrary, when contaminated sludge CS is being received into vessel 12 that is not well-digested, it is very desirable to enhance the oxidation by supplementing the regenerative oxidant RO, compressed air. FIG. 2 depicts the present invention with an alternative combination of devices to practice the present invention with a supplemental regenerative oxidant SRO. This alternative combination of devices is substantially similar to the one shown in FIG. but is adapted to facilitate a second regenerative oxidant SRO stored in a second regenerative oxidant source 44. The second regenerative oxidant SRO could be in liquid form such as hypochlorite or hydrogen peroxide or in gaseous form such as sulphur dioxide, chlorine or ozone. An ORP sensor element 46 in fluid contact with the reacting slurry RS transmits ORP information to an ORP controller 48 which, in turn, controls the amount of the second regenerative oxidant SRO dispensed into vessel 12 by adjusting the opening and closing of an ORP valve 50 by an ORP control valve actuator 52.

This enhanced oxidation not only increases the rate and degree of solubilization of the heavy metals but also substantially reduces the final chemical oxygen demand and biological oxygen demand of the sludge.

FIG. 3 reflects a conceptual flow chart of the present invention. Contaminated sludge, a catalytic oxidant, a regenerative oxidant and acid are mixed to form a reacting slurry having a solids fraction and a liquid fraction. While mixing occurs, oxidation and acidification also occur. After a period of residence time, the reacting slurry is preferably washed and separated into its solids fraction and its liquid fraction. The separated solids fraction is detoxified sludge which is now substantially free of heavy metals. The liquid fraction is directed to a conventional metals recovery system where the metals are precipitated from the liquid and the barren liquid is neutralized and discarded as wastewater or a portion of it could be recycled through the wastewater treatment plant to satisfy its needs for water.

A graph of the solubilization rate of heavy metals from anaerobic sludge is shown in FIG. 4. These results were generated empirically. Note that in 10 minutes approximately 75% of the chromium, approximately 82% of the lead and approximately 85% of the cadmium have been solubilized at an ORP of +770 mv and in a pH environment of 1.5. As residence time increased, the percent of extracted metals improved. As expected, as ORP increases, the rate of solubilization of heavy metals increases.

Quantitative results from testing samples of sludge from a western city in the United States implementing the present invention are summarized in Table I below:

TABLE I

| Metal | Heavy Metals Concentration (milligrams per kilogram) | |
|---|---|---|
| | Head[1] Sample | Residue[2] Sample |
| Cadmium | 36 | 1 |
| Chromium | 1,270 | 149 |
| Copper | 2,500 | 81 |
| Lead | 486 | 7 |
| Nickel | 431 | 23 |
| Zinc | 2,820 | 50 |

[1] before implementing the present invention
[2] after implementing the present invention The U.S. Environmental Protection Agency has proposed lifetime cumulative loading rate standards for the above-listed metals for application of sewage sludge contaminated with heavy metals on agricultural lands. Table II below reflects these proposed standards and compares the amounts of this particular sewage sludge in metric tons which would be permitted under these standards for application onto agricultural land.

TABLE II

| Metal | Number of Metric Tons of Sludge Allowed per Hectare | | EPA Cumulative Loading Rate for Agricultural Land (kilograms/hectare) |
|---|---|---|---|
| | Head Sample | Residue Sample | |
| Cadmium | 500 | 16,000 | 16 |
| Chromium | 417 | 3,557 | 526 |
| Copper | 16 | 568 | 46 |
| Lead | 257 | 17,857 | 125 |
| Nickel | 161 | 3,391 | 78 |
| Zinc | 60 | 3,400 | 170 |

To determine how much of this particular sludge could be applied to one hectare of agricultural land before it would be banned forever from that particular hectare for agricultural land use, the worst-case metal contaminant, copper, must be examined. Prior to implementing the present invention, only 16 metric tons of this particular sludge would be permitted under the proposed regulations to be applied to one hectare of agricultural land. However, after implementation of the present invention, 568 tons of this sludge or over 30 times as much of this particular sludge could be applied to one hectare of agricultural land before it would be banned forever therefrom.

Advantages of the present invention abound.

The rate of oxidation of the contaminated sludge occurs much more rapidly than any other prior art sludge detoxification systems. It is theorized that the positive ionic state of the iron in the ferric chloride causes much of the rapid oxidation to occur. Both ferric chloride used as the catalytic oxidant and air used as the gaseous regenerative oxidant were selected for the preferred embodiment of the present invention. Ferric chloride in solution yields an iron ion, $Fe^{3+}$, which is an ion having a plus three positive charge. During oxidation of the sludge, $Fe^{3+}$ is reduced to a ferrous iron ion, $Fe^{2+}$ which is rapidly re-oxidized by the regenerative oxidant RO. The ferric ions, therefore, are not consumed but instead produce a catalytic effect enhancing oxidation of the reacting slurry. It is well known in the field of chemistry that ferric iron, $Fe^{3+}$, oxidizes sulphidic/metallic compounds to elemental sulphur and metal ions more rapidly than most gaseous oxidants. By applying air or some other gaseous oxidant simultaneously to the reacting slurry, the ferrous iron ion, $Fe^{2+}$, is regenerated in situ back into ferric iron, $Fe^{3+}$, which can again be utilized as a powerful oxidant. The following chemical equations, as an example for sulphur/metallic compounds, illustrate the effectiveness of the catalytic oxidant, ferric chloride, and the regenerative oxidant.

The leach reaction equation:

$$MeS + 2FeCl_3 \rightarrow MeCl_2 + S^o + 2FeCl_2$$

The regenerative reaction equation:

$$2FeCl_2 + 0.5O_2 + 2HCl \rightarrow 2FeCl_3 + H_2O$$

By adding these two equations, the ferric chlorides and ferrous chlorides on both sides of the equation cancel each other thus producing, in theory, a catalytic effect.

Since the amount of oxidation generated by the present invention is substantial, the present invention can increase through-put capacity of present anaerobic or aerobic wastewater treatment plants. Because naturally-occurring, biological oxidation is an inherently slow process, wastewater treatment plants require from 10 days to as long as 30 days residence time for anaerobic or aerobic digestion to take place. Now, with increased amounts of oxidation, wastewater treatment plants could reduce their residence time for anaerobic or aerobic digestion and transfer its partially-digested sludge to the present invention for further oxidation. This feature could be extremely helpful, for example, to resort communities where peak demand for sewage processing occurs during the tourist season. Thus, resort communities would not be required to finance expansion of their digestion facilities solely to handle a seasonal peak demand for sewage processing if the present invention was retro-fitted onto present wastewater treatment systems.

Another advantage of the present invention is that it is insensitive to exacting quantities of acid, ferric salt and gaseous oxidant. As long as the pH of the reacting slurry is approximately between 1.0 and 2.0 and as long as the ORP is greater than +400 millivolts, the present invention will function properly. Optimally, a ferric iron concentration in the reacting slurry would be between 0.5 and 3.0 grams per liter of reacting slurry. A low concentration of ferric iron could potentially be compensated by increased oxidation from the gaseous oxidant. A higher concentration of ferric iron tends to produce a reacting slurry that is easier to filter than a reacting slurry with a weaker concentration of ferric iron. The residence time can also vary. Thirty (30) minutes is a recommended residence time period because it comports with a time period required to destroy the Ascaris ova which is discussed in more detail hereinbelow and is considered reasonable for high percentage of metals dissolution. However, as stated above, experimentation has shown that a residence time period of 10 minutes was sufficient to extract substantial quantities of heavy metals present in the solids fraction of sewage sludge.

The use of ferric iron yields numerous benefits. First after, ferric iron as a catalytic oxidant is reduced, it can be regenerated in situ using a gaseous oxidant such as air or a liquid oxidant such as hydrogen peroxide. Second, leaching rates are substantially higher with a ferric salt present. Third, ferric iron rapidly oxidizes most sulphidic/metallic compound thereby oxidizing the same to elemental sulphur and metal ions. Lastly, the presence of iron in solution is commonly known in industry to assist in the precipitation of the other metals from solution. It is well known in industry that during precipitation iron coagulates the other metals in solution and rapidly scavenges the same. Therefore, the presence of iron itself is beneficial in the recovery of dissolved metals from solution.

The present invention by virtue of its low pH environment can destroy many pathogenic organisms resulting in substantially reduced coliform counts. Furthermore, the present invention could also be easily adapted to destroy the more acid-resistant pathogenic organisms such as ova of the roundworm Ascaris specie which is considered as one of the most environmentally resistant pathogenic organisms. Although not shown in the drawings, a heating means could be easily adapted to the combination of devices which practices the present invention. For example, a shell and tube heat exchanger could be employed before the contaminated sludge enters the vessel or, alternatively, heating coils could be installed within the vessel. It is generally agreed that maintaining sewage sludge or, in this case, the reacting slurry at a temperature of 60° C. for a period of, at least, 30 minutes, ova of the Ascaris roundworm are rendered inert. As a result, adapting a heating means to the present invention, not only enhances detoxification occur but also provides sterilization of the detoxified sludge.

The preferred embodiment of the present invention and its significant advantages and advancements over prior art have been described with a degree of specificity. It should be understood, however, that the specificity of description has been made by way of example only and that the scope of the invention is defined in the appended claims.

What is claimed is:

1. A method for detoxification of sewage sludge containing heavy metals, comprising the steps of:
   (a) mixing a quantity of sludge, a quantity of at least one catalytic oxidant comprising at least about 0.5 grams per liter of a ferric salt, a quantity of at least one regenerative oxidant and a quantity of acid to form a reacting slurry having a solids fraction and a liquid fraction, said quantities of said oxidants being sufficient to raise said reacting slurry to an oxidation reduction potential to at least +400 millivolts and said quantity of acid being sufficient to lower said reacting slurry to an approximate range of pH between approximately 1.0 and 2.0;
   (b) concurrently maintaining said reacting slurry at said oxidation reduction potential and said pH for a period of at least about 10 minutes; and
   (c) separating said solids fraction from said liquid fraction to produce an acidic, detoxified sludge and an acidic, metals-laden liquid.

2. A method as defined in claim 1, wherein said ferric salt is ferric chloride.

3. A method as defined in claim 1, wherein said regenerative oxidant is gaseous.

4. A method as defined in claim 3, wherein said gaseous regenerative oxidant is compressed air.

5. A method as defined in claim 1, wherein said regenerative oxidant is liquid.

6. A method as defined in claim 5, wherein said liquid regenerative oxidant is a peroxide.

7. A method for detoxification of sewage sludge containing heavy metals, comprising the steps of:
   (a) mixing sewage sludge, a ferric salt and acid with compressed air to form a reacting slurry having a solids fraction and a liquid fraction, said ferric salt is in an amount between 0.5 and 3.0 grams per liter of said reacting slurry, said compressed air is in an amount sufficient to raise said reacting slurry to an oxidation reduction potential to at least +400 millivolts and said acid is in an amount sufficient to lower the pH of said reacting slurry to an approximate range between 1.0 and 2.0;
   (b) concurrently maintaining said reacting slurry at said oxidation reduction potential and said pH for a period of at least 10 minutes; and
   (c) separating said solids fraction from said liquid fraction to produce an acidic, detoxified sludge and an acidic, metals-laden liquid.

8. A method as defined in claim 7, further comprising the step of: mixing a liquid oxidant into said reacting slurry.

9. A method as defined in claim 7, wherein said ferric salt is selected from a group consisting of ferric chloride and ferric sulfate.

10. A method for detoxification of sewage sludge containing heavy metals, comprising the steps of:
    (a) mixing sewage sludge, a ferric salt, a liquid oxidant and acid to form a reacting slurry having a solids fraction and a liquid fraction, said ferric salt is in an amount between 0.5 and 3.0 grams per liter of said reacting slurry, said liquid oxidant is in an amount sufficient to raise the oxidation reduction potential of said reacting slurry to at least +400 millivolts, and said acid is in an amount sufficient to lower the pH of said reacting slurry to an approximate range between 1.0 and 2.0;
    (b) concurrently maintaining said reacting slurry at said oxidation reduction potential and said pH for a period of at least 10 minutes; and
    (c) separating said solids fraction from said liquid fraction to produce an acidic, detoxified sludge and an acidic, metals-laden liquid.

11. A method as defined in claim 10, wherein said liquid oxidant is a peroxide.

* * * * *